Nov. 2, 1965 J. OSWALD 3,215,788

VOICE-FREQUENCY AMPLIFIERS

Filed Oct. 29, 1959 4 Sheets-Sheet 1

INVENTOR

Jacques Oswald

By: Craig & Freudenberg

ATTORNEYS

Nov. 2, 1965

J. OSWALD 3,215,788

VOICE-FREQUENCY AMPLIFIERS

Filed Oct. 29, 1959

4 Sheets-Sheet 2

INVENTOR

Jacques Oswald

By: Craig & Freudenberg

ATTORNEYS

VOICE-FREQUENCY AMPLIFIERS

Filed Oct. 29, 1959

INVENTOR
Jacques Oswald
By: Craig & Freudenberg
ATTORNEYS

INVENTOR
Jacques Oswald
By: Craig & Freudenberg
ATTORNEYS

United States Patent Office 3,215,788

Patented Nov. 2, 1965

3,215,788

VOICE-FREQUENCY AMPLIFIERS

Jacques Oswald, Versailles, France, assignor to CIT-Compagnie Industrielle des Telecommunications, Paris, France Filed Oct. 29, 1959, Ser. No. 849,625
Claims priority, application France, Nov. 18, 1958, 779,413
6 Claims. (Cl. 179—170)

The present invention relates to a device which enables, in a transmission line, the amplification of alternating currents while ensuring the galvanic continuity of the line, and consequently, the passage of direct current.

It is known that the normal two-wire or four-wire telephone repeaters do not ensure the continuity of the circuits, and consequently require the presence of a special signalling device for the retransmission of call signals of very low frequency, for example, of 60 cycles per second. In the case of two-wire systems, it has been possible to overcome this difficulty by substituting for the two-wire repeaters negative-impedance repeaters of a special type. The arrangement according to the present invention provides a more general solution and permits utilization of repeaters having electrical characteristics, such as connecting impedance, gain or attenuation at every frequency, of the same value as that of ordinary voice-frequency repeaters.

According to the present invention, one inserts in series with the conductors of a telephone line forming part of a "four-wire circuit," two windings of a first hybrid coil, whereby the "West" side is connected to a first pair of terminals and the "East" side is connected to a second pair of terminals in galvanic connection with the terminals of the first pair, the two other pairs of terminals of the said hybrid coil being connected to two of the pairs of terminals of a second hybrid coil of which the two other pairs of terminals are connected, respectively, to input terminals and output terminals of a unidirectional repeater, of which the electric characteristics, as seen from the terminals "West" and "East" of the telephone line, have the same values as at the terminals themselves of the unidirectional repeater.

According to another embodiment of the present invention, one inserts in series with the conductors of a telephone line forming part of a "two-wire circuit," two windings of a first hybrid coil, whereby the "West" side is connected to a first pair of terminals and the "East" side to a second pair of terminals in galvanic connection with the terminals of the first pair, the two other pairs of terminals of the said first hybrid coil being connected to two of the pairs of terminals of a second hybrid coil, of which the other pairs of terminals are connected respectively to the connecting terminals of a bidirectional amplification device of the "two-wire" type, of which the electric characteristics, as seen from the terminals "West" and "East" of the telephone line, have the same values as at the terminals themselves of the bidirectional repeater device.

Figure 1:
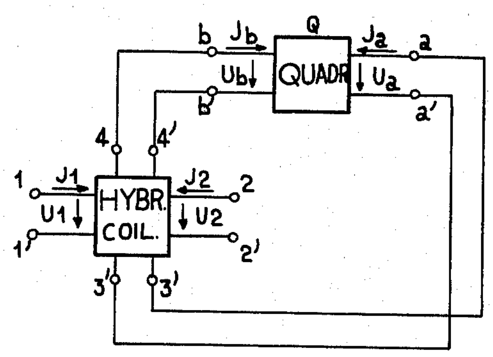

The present invention will now be described in detail by reference to the various figures of the drawing, in which FIGURE 1 represents, in diagrammatic form, the known combination of a quadripole and of a hybrid coil.

Figure 2:
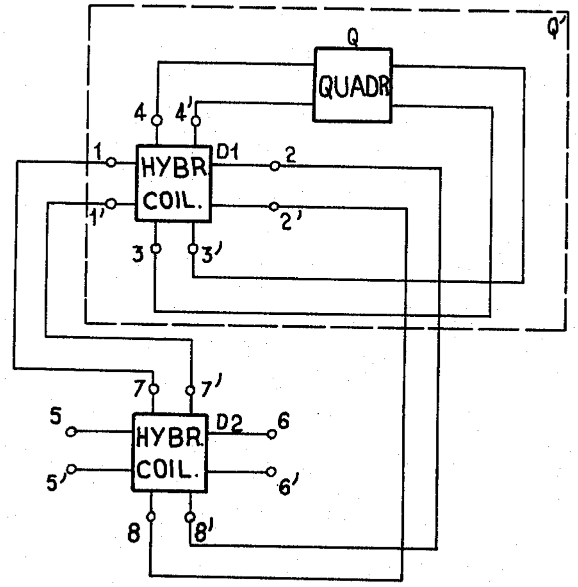

FIGURE 2 represents, in diagrammatic form, the combination according to the present invention, of the diagram of FIGURE 1 with a second hybrid coil.

Figure 3A:
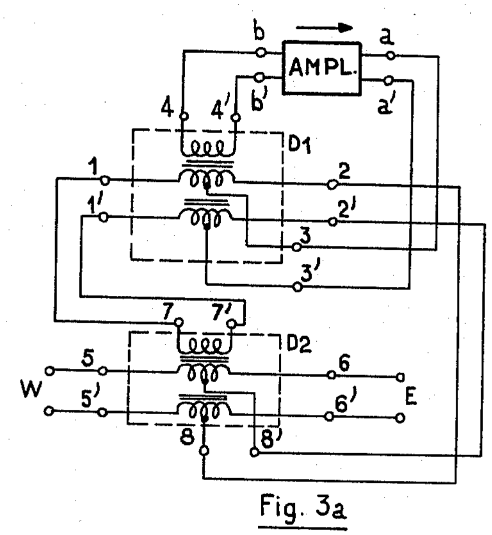
Figure 3B:
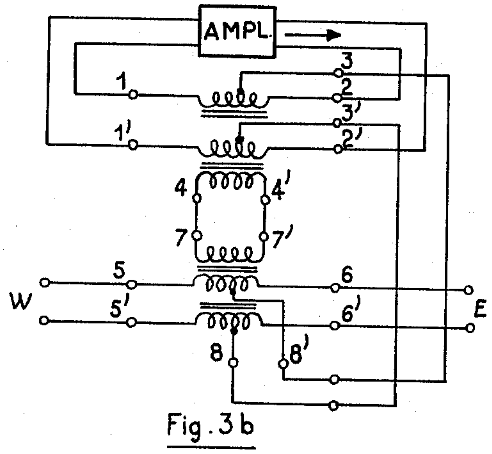
Figure 3C:
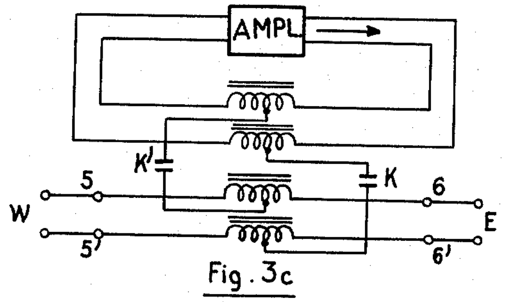

FIGURES 3*a*, 3*b* and 3*c* illustrate three embodiments of circuit diagrams representing the application of the present invention to the case of a four-wire repeater.

Figure 4A:
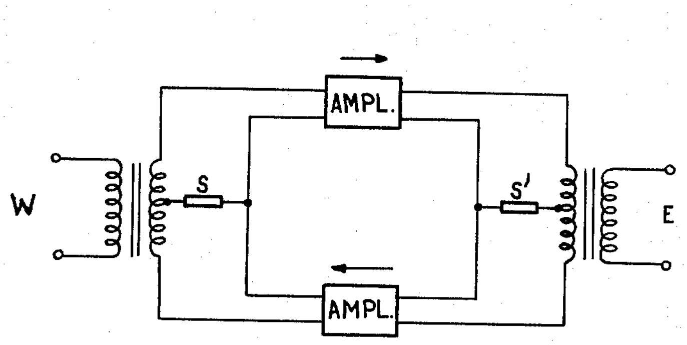
Figure 4B:
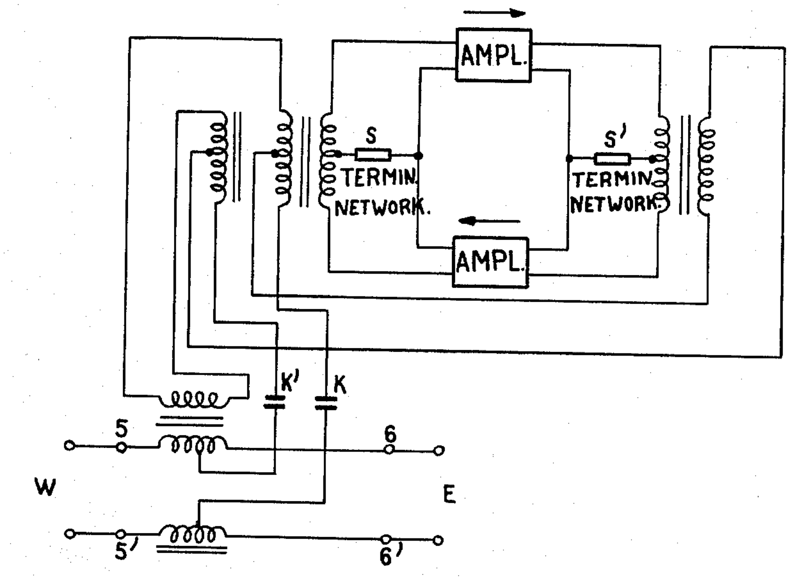
Figure 5A:
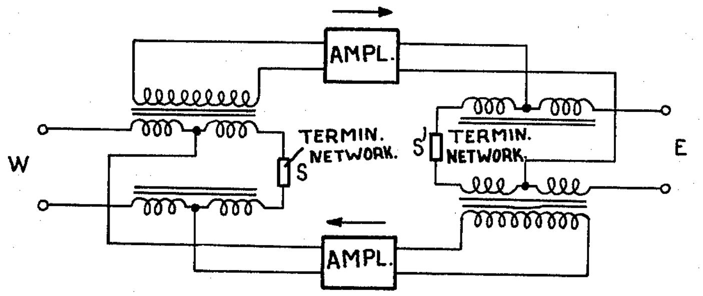
Figure 5B:
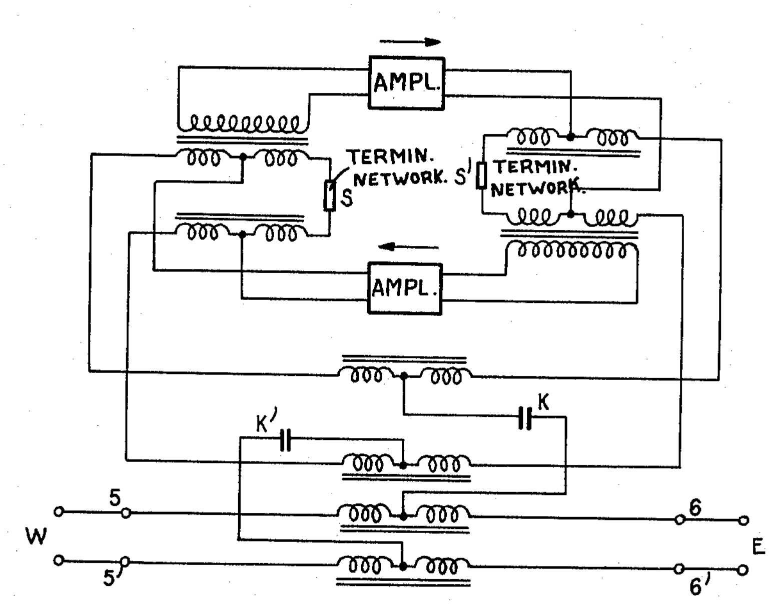

FIGURES 4*a* and 5*a* illustrate two classical circuit diagrams of two-wire repeaters, and FIGURES 4*b* and 5*b* illustrate, respectively, two embodiments of circuit diagrams representing the application of the present invention to FIGURES 4*a* and 5*a*.

In FIGURE 1, the line is connected on the side W to the terminals 11′ of a hybrid coil D1, and on the side E to the terminals 22′ of the same hybrid coil. Reference character Q designates any known passive or active quadripole of which the terminals *aa′* are connected to the terminals 33′ of the hybrid coil and of which the terminals *bb′* are connected to the terminals 44′ of the hybrid coil.

Designating by *Zaa*, *Zab*, *Zba*, *Zbb* the various terms of the impedance matrix of quadripole Q, one has, by definition:

$$Ua = ZaaIA + ZabIb$$
$$Ub = ZbaIa + ZbbIb \qquad (1)$$

Similarly, designating by Z′11, Z′12, Z′21, Z′22 the diferent terms of the impedance matrix at points 11′ and 22′ of FIGURE 1, one will have:

$$U1 = Z'11I1 + Z'12I2$$
$$U2 = Z'21I1 + Z'22I2 \qquad (2)$$

On the other hand, there exist relations between *Ua*, *Ub* and U1, U2 and also between I*a*, I*b*, and I1, I2. These relations which express well-known properties of the hybrid coil and are classic, are as follows:

$$Ua = \frac{U1 + U2}{2}$$
$$Ub = \frac{U1 - U2}{2}$$
$$Ia = I1 + I2$$
$$Ib = I1 - I2 \qquad (3)$$

By replacing, in the two equations of the set (1), *Ua* and *Ub*, I*a* and I*b* by the values derived from the set of Equations (3), one obtains the new set of Equations (1′).

$$\frac{U1 + U2}{2} = Zaa(I1 + I2) + Zab(I1 - I2)$$
$$\frac{U1 - U2}{2} = Zba(I1 + I2) + Zbb(I1 - I2) \qquad (1')$$

By taking the sum, member by member, of the two equations of set (1′) one obtains an expression for U1; by taking the difference, member by member, between the two equations of set (1′) one obtains an expression for U2. These expressions are as follows:

$$U1 = (Zaa + Zab + Zba + Zbb)I1 + (Zaa - Zab + Zba - Zbb)I2$$
$$U2 = (Zaa + Zab - Zba - Zbb)I1 + (Zaa - Zab - Zba + Zbb)I2 \qquad (2')$$

By comparing, term by term, the equations of the sets (2) and (2′), one obtains the following relations:

$$Z'11 = Zaa + Zab + Zba + Zbb$$
$$Z'12 = Zaa - Zab + Zba - Zbb$$
$$Z'21 = Zaa + Zab - Zba - Zbb$$
$$Z'22 = Zaa - Zab - Zba + Zbb \qquad (4)$$

One may admit that the terminals 11′, 22′, are the terminals of any quadripole Q′ of which the impedance matrix is given by the set of Equations (4).

Let us now consider the connections of FIGURE 2. The rectangle in dash line encloses the assembly of the quadripole Q and of the hybrid coil D1 which constitute, according to the foregoing convention the quadripole Q′. To this quadripole Q′ is connected the hybrid coil D2 exactly in the same manner as the hybrid coil D1 has been connected to quadripole Q in FIGURE 1: The terminals 77′ of the hybrid coil D2 are connected to the terminals 11' of the quadripole Q' and the terminals 88' of the hybrid coil D2 are connected to terminals 22' of quadripole Q'.

The terminals 55' and 66' of the hybrid coil D2 may be considered as the connecting terminals of a new quadripole Q''.

By symmetry, one may immediately write the terms of the impedance matrix of the quadripole Q'', by referring to the set of Equations (4):

$$\begin{aligned} Z''11&=Z'11+Z'12+Z'21+Z'22\\ Z''12&=Z'11-Z'12-Z'21-Z'22\\ Z''21&=Z'11+Z'12-Z'21-Z'22\\ Z''22&=Z'11-Z'12-Z'21+Z'22 \end{aligned} \quad (5)$$

If in the set of Equations (5) one replaces the terms Z'11, Z'12, Z'21 and Z'22 by their value as a function of Zaa, Zab, Zba and Zbb derived from the set of Equations (4), one obtains after simplification the following result:

$$\begin{aligned} Z''11&=4Zaa\\ Z''12&=4Zab\\ Z''21&=4Zba\\ Z'22&=4Zbb \end{aligned} \quad (6)$$

The Equations (6) show that, except for a coefficient of 4, the quadripole Q'' has exactly the same impedance matrix as the initial quadripole Q. It is easy to give to the quadripole Q' exactly the same impedances as to the quadripole Q by the operative association of transformers having a ratio of ½, or, more simply, by judiciously selecting the ratios of windings of the hybrid coils according to well-known properties of the latter.

It will be shown hereinafter that with the connection of FIGURE 2 and similar circuit connections one obtains, indeed, the advantages of galvanic continuity and conservation of the electric values mentioned hereinabove.

In a first embodiment of the present invention derived from FIGURE 2 and represented in FIGURE 3*a*, in which the quadripole Q is constituted by a unidirectional amplifier, are shown the individual windings of hybrid coils D1 and D2. One may readily see in this figure that between the side W and the side E of a telephone line connected to the terminals 55' and 66' of the hybrid coil D2, there exists a galvanic connection. On the other hand, according to the foregoing expose, one will have at the terminals 55' and 66' exactly the same impedances and the same gain at every frequency as at the terminals of the repeater itself.

By two transformations, having recourse to well-known properties of the hybrid coil, one will arrive at a first preferred form of the present invention.

It is known in effect that the four pairs of terminals of a hybrid coil play two by two an analogous role, and that one can change the same while maintaining the properties of such device. It is by this operation that one passes from the connection of FIGURE 3*a* to the connection according to FIGURE 3*b*, by connecting the terminals 44' and 33' of the hybrid coil D1 to the terminals 77' and 88', respectively, of the hybrid coil D2, whereby the quadripole Q is then connected to the terminals 11' and 22' of the hybrid coil D1, instead of the terminals 44' and 33' of FIGURE 3*a*.

On the other hand, it is known that the galvanic connections of the hybrid coils D1 and D2 by the intermediary of the windings of terminals 44' and 77' may be replaced by a magnetic coupling obtained by winding the coils of the two hybrid coils D1 and D2 on the same magnetic core, to the exclusion of the coils 44' and 77' which are then eliminated.

Such an arrangement is illustrated in FIGURE 3*c*, which illustrates the most economic form of application of the present invention in case of a four-wire repeater.

In FIGURES 4*b* and 5*b* are illustrated, as non-limitative examples, the application of the arrangement of the present invention to two-wire repeaters of a telephone line.

FIGURE 4*a* illustrates the well-known schematic diagram of a bidirectional repeater connection for a two-wire telephone line with terminating means S and S' connected between mid-points of two conventional hybrid coils. FIGURE 4*b* illustrates an equivalent connection, improved by the application of the present invention, with galvanic continuity between the terminals "West" and "East" of the telephone line, whereby the values of the electric magnitudes of the repeater, as seen from the terminals "West" and "East" of the line, are the same as at the terminals themselves, respectively, of the repeater.

FIGURE 5*a* illustrates the well-known schematic diagram of a bidirectional repeater connection for a two-wire telephone line with terminating means S and S' connected to a pair of lateral terminals of conventional hybrid coils. FIGURE 5*b* illustrates the equivalent connection improved by the application of the present invention in the same conditions as in the preceding embodiment.

All the other details of the connections of FIGURES 4*b* and 5*b* may be readily deduced from the explanations given hereinabove and obviate, for a person skilled in the art, the need for a detailed discussion of these figures.

I claim:

1. In combination, a first signal line section having two terminals, a second signal line section having two terminals and a repeater circuit connection which ensures the galvanic continuity between the two signal lines and the direct transmisison of the totality of the band of frequencies sent over at least one of said signal lines, comprising:

hybrid coil means having a plurality of winding means, each of said winding means having an input terminal, an output terminal and a mid-tap, amplifying means having a first and a second pair of terminals, first connecting means operatively connecting the terminals of the first signal line, respectively, to the input terminals of a first and a second of said winding means, second connecting means operatively connecting the terminals of the second signal line, respectively, to the output terminals of said first and said second winding means, third connecting means operatively connecting the input terminals of a third winding means and a fourth winding means, respectively, to the terminals of the first pair of the terminals of the amplifying means, fourth connecting means operatively connecting the output terminals of said third and fourth winding means, respectively, to the terminals of the second pair of the terminals of the amplifying means, and further connecting means operatively connecting the mid-tap of the first and second winding means, respectively, to the mid-taps of the third and fourth winding means.

2. The combination according to claim 1, wherein the turns of the winding means and the magnetic coupling in said hybrid coil means are such that the values of the electric characteristics measured, respectively, at the pairs of terminals of the first and second signal lines are equal, respectively, to the corresponding values measured directly at the first and the second pair of terminals of the amplifying means.

3. The combination according to claim 2 wherein amplifying means consists of a unidirectional amplifier having a first and a second pair of terminals.

4. The combination according to claim 2 wherein amplifying means essentially consists of a bidirectional amplifier having a first and a second pair of terminals.

5. The combination according to claim 4 wherein the bidirectional amplifier includes a first and a second terminal network, two hybrid coils having each one pair of mid-taps, one pair of secondary terminals, and two pairs of main terminals, each pair of mid-taps of one of these hybrid coils being connected through a unidirectional amplifier, respectively, to the pair of secondary terminals of the second hybrid coil, one of the pairs of main terminals of each hybrid coil being connected to terminals of said first and second terminal networks, respectively, the second of the pairs of the main terminals forming, respectively, a first pair of terminals and a second pair of terminals of the amplifying means.

6. The combination according to claim 5 wherein said further connecting means includes condenser means connected between the mid-taps of said first and second windings and the mid-taps of said second and third windings, respectively.

References Cited by the Examiner

UNITED STATES PATENTS

| | | | |
|---|---|---|---|
| 1,866,261 | 7/32 | Lutomirski | 333—11 |
| 2,106,337 | 1/38 | Black | 179—170 |
| 2,282,465 | 5/42 | Edwards | 179—170 |
| 2,909,733 | 10/59 | Walter | 179—170 |
| 2,924,673 | 2/60 | Duinker | 179—170 |

ROBERT H. ROSE, *Primary Examiner.*

E. JAMES SAX, WALTER L. LYNDE, *Examiners.*